United States Patent [19]

West

[11] Patent Number: 5,074,053

[45] Date of Patent: Dec. 24, 1991

[54] MAGNETICALLY ACTUATED LINEAR POSITION SENSOR

[76] Inventor: John D. West, P.O. Box 10346, Raleigh, N.C. 27605

[21] Appl. No.: 566,078

[22] Filed: Aug. 13, 1990

[51] Int. Cl.$^5$ .................. G01F 23/62; G01F 23/72; G01F 23/30
[52] U.S. Cl. .................................. 33/708; 73/313; 73/314; 73/319; 340/624; 324/207.24
[58] Field of Search ........... 73/313, 314, 305, DIG. 5, 73/319; 340/623, 624, 870.16; 361/284; 324/207.24; 336/75; 33/708

[56] References Cited

U.S. PATENT DOCUMENTS

| | | | |
|---|---|---|---|
| 2,484,690 | 10/1949 | De Giers | 73/313 |
| 3,377,537 | 4/1968 | Braitsford | 340/624 X |
| 3,678,750 | 7/1972 | DiNoia et al. | 73/DIG. 5 X |
| 4,175,435 | 11/1979 | Hara | 73/DIG. 5 X |
| 4,258,238 | 3/1981 | Dombrowski et al. | 73/313 X |
| 4,384,184 | 5/1983 | Alvarez | 340/624 X |
| 4,627,283 | 12/1986 | Nishida et al. | 340/624 X |
| 4,631,375 | 12/1986 | McCann | 340/624 X |
| 4,827,769 | 5/1989 | Riley et al. | 340/624 X |

FOREIGN PATENT DOCUMENTS 228984 10/1968 U.S.S.R. .................. 73/DIG. 5

OTHER PUBLICATIONS

Hersey Measurement Co., Liquid Level Model VR-2 12/88.

Primary Examiner—Stuart S. Levy
Assistant Examiner—Joseph A. Rhoa

[57] ABSTRACT

A linear sensing device containing an electrically conductive reed strip which, in the presence of an external actuating horseshoe magnet, makes electrical contact to a resistive strip at the location of that magnet. The conductive reed strip is attached along one end to a supporting member, formed from a material with coefficient of thermal expansion similar to the reed strip, to prevent warping of the reed strip over a range of environmental temperatures. The sensing device is of a modular construction with elongate cap, to which the resistive strip is attached, and an elongate base, to which the reed strip support member is attached. The cap and base mate together to form an inner container which then slides into an outer container.

6 Claims, 3 Drawing Sheets ial. An electrically resistive element (5), in this embodiment consisting of a winding of electrical resistance wire (50) on a flat core (52) constructed of flexible electrically insulating material, is located adjacent to the ends of the reed type conductor strip, and is separated from the strip by a small air gap. The electrically resistive element runs the length of the sensing apparatus. An actuator (6), has a slide fit over the tubular container, and may be constructed of any non-magnetic material. Depending on the applications, the actuator may be a float for sensing the surface level of a liquid, or may be an attachment point for connection to a moveable physical object. The actuator contains a horseshoe magnet (7), positioned as shown with the poles of the magnet on a line perpendicular to the length of the tubular container. A mechanical stop (8), is removably fastened to the bottom of the tubular container, to prevent the actuator from accidentally sliding off the sensing device. A permanent flange (9), serves as an upper stop for the actuator and may also be used as an attachment point for mounting the sensing device.

MAGNETICALLY ACTUATED LINEAR POSITION SENSOR

BACKGROUND OF THE INVENTION

1. Field of the Invention

This invention relates in general to the sensing of the linear position of a moveable object or surface, and in particular to sensing devices providing a variable resistance electrical signal output, and actuated by means of a magnet on the moveable object or surface.

2. Description of Related Art

There is a strong demand for a linear position sensor which can serve a dual purpose; one that can measure the position of a moveable object, such as a gate or adjustable weir, and can also be used to measure fluid level. The desired sensor must detect position or level in a continuous and precise manner, must contain no active electronics, and must be sealed from fluid and ambient surroundings.

Related inventions include the DiNola U.S. Pat. No. 3,678,750, the Kübler U.S. Pat. No. 3,976,963, and the Nishida U.S. Pat. No. 4,627,283. These inventions all consist of discrete rather than continuous components, and suffer from poorer resolution than would be available with continuous components. In the Lew U.S. Pat. No. 4,730,491 and U.S. Pat. No. 4,796,472, the resistor is continuous while the switch mechanisms are still discrete. Resolution is greatly improved, but at the cost of considerable complexity. Also, in most embodiments of the Lew invention, the switches are retracted by gravitational force, requiring an upright mounting position for the sensor.

An unpatented sensor manufactured by Hersey Products, Inc. of Spartanburg, S.C. provides the desired features, but is limited in operating temperature range and is relatively difficult to manufacture.

SUMMARY OF THE INVENTION

This invention is an improvement on unpatented prior art manufactured and sold under the designation "Model VR-2" by Hersey Products, Inc., of Spartanburg, S.C. The existing art suffers from a limited operating temperature range. The object of this invention is to provide the benefits and operation of the existing devices over at least the range of temperatures commonly encountered in outdoor installation. This is achieved with the addition of a supporting member with coefficient of thermal expansion identical to that of the reed type conductor strip, to stabilize the reed strip during temperature changes. The invention also contains several features to make it more easily manufacturable.

DESCRIPTION OF THE PREFERRED EMBODIMENTS

Figure 1:
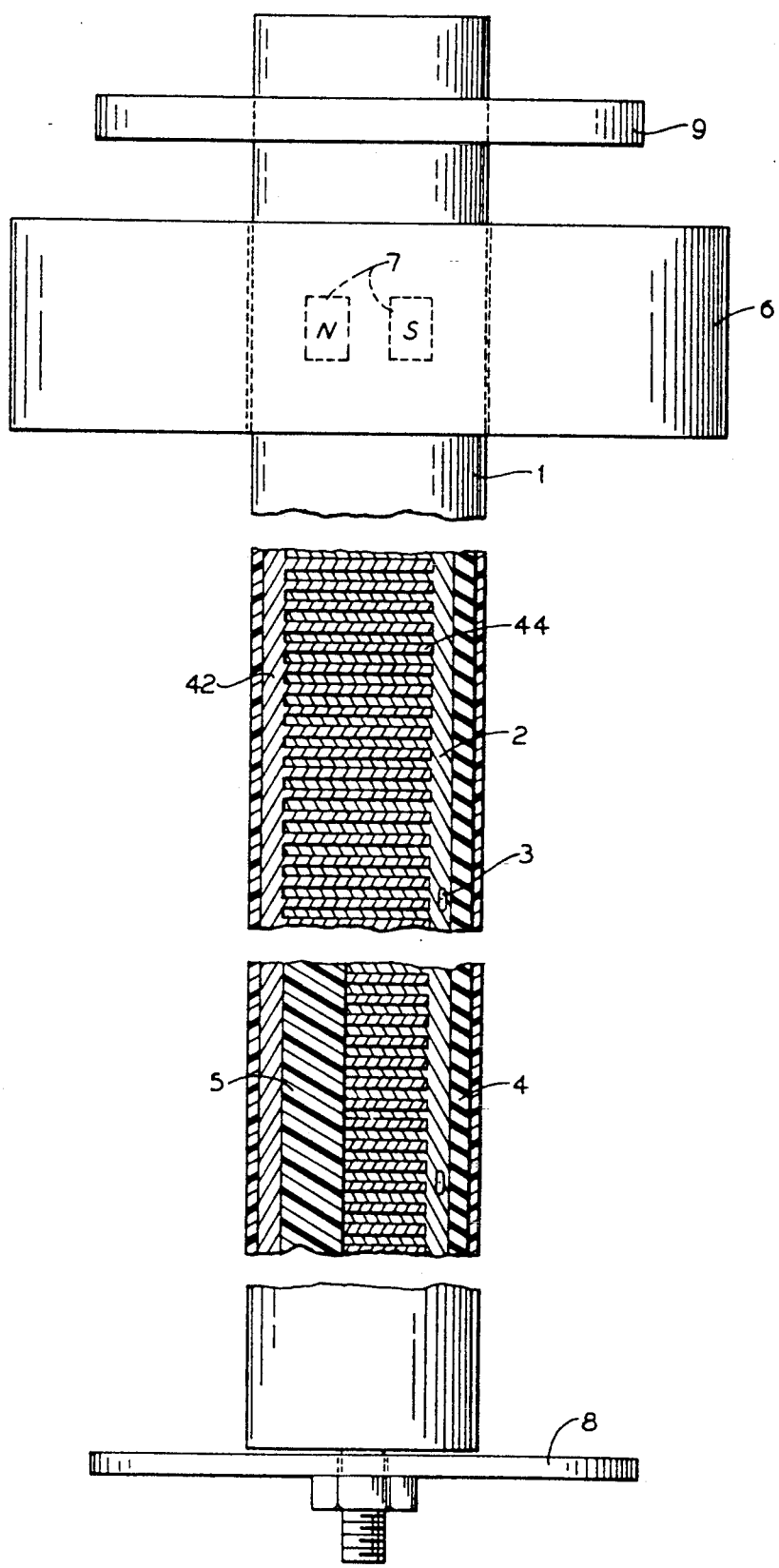
FIG. 1, illustrates the general arrangement of the preferred embodiment of the position sensing device.
Figure 2:
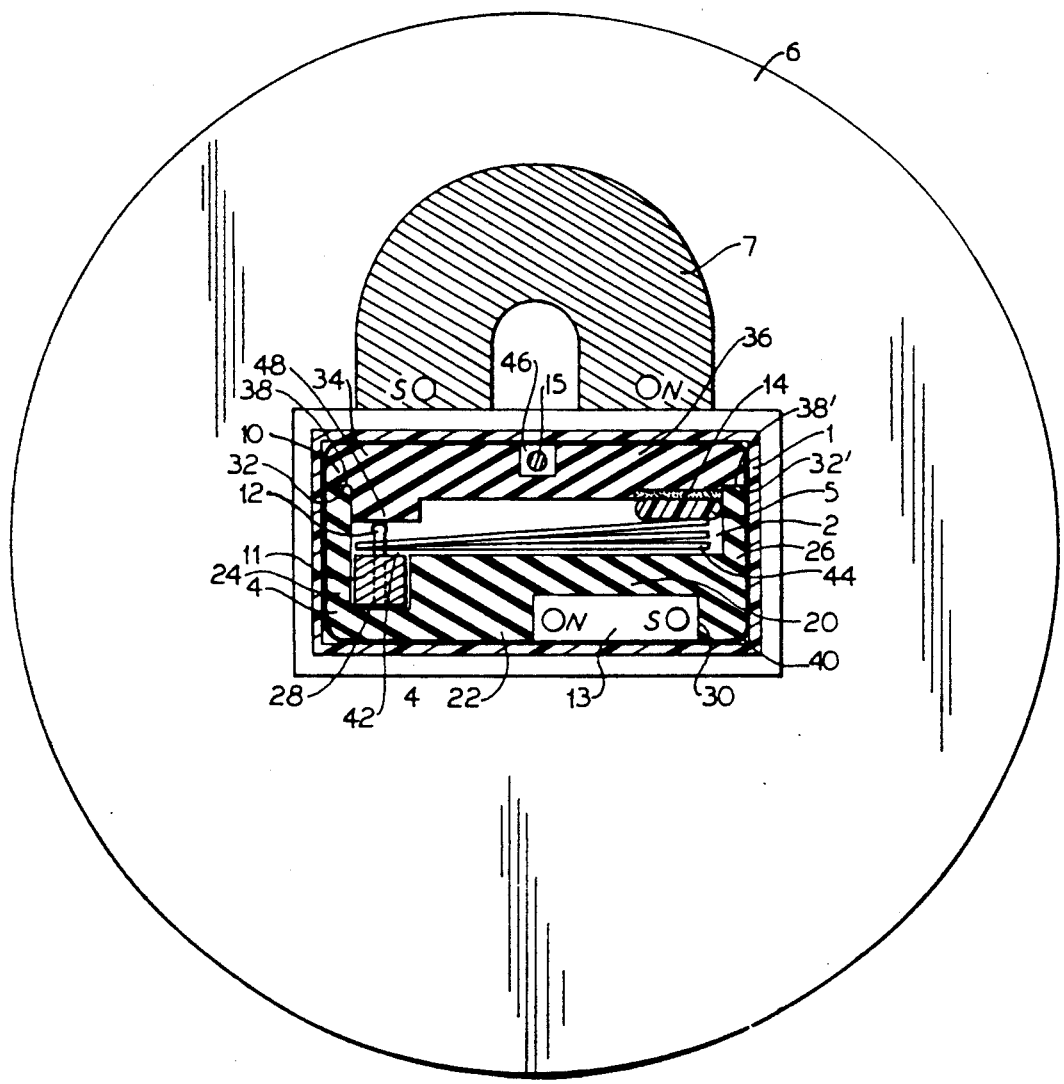
FIG. 2, illustrates a cross-sectional view of the preferred embodiment of the position sensing device.

In FIG. 1, there is illustrated the general arrangement of the preferred embodiment of the linear position sensing device. This embodiment consists of an elongated tubular container of rectangular cross-section (1), sealed against fluid and ambient surroundings. The tubular container is constructed of a non-magnetic material, and contains the sensing apparatus. The sensing apparatus is comprised of: the reed type conductor strip (2), which is constructed of a thin flexible ferro-magnetic material. The reed type conductor strip runs the length of the sensing apparatus and contains elongated holes (3), placed at intervals along the back edge of the strip. The reed type conductor strip rests on a base (4), constructed of a non-magnetic electrically insulating mate- In FIG. 2, is illustrated a cross-section of the position sensing device. The device consists of the tubular container (1), containing base (4) and cap (10), constructed of non-magnetic electrically insulating material. The base contains a slot (28) in its top portion (20) adjacent to its first side portion (24) which hold a support member (11), located as illustrated along the back edge of the reed type conductor strip (2). The support member is constructed of a material with coefficient of thermal expansion similar to that of the reed type conductor strip. The support member is intended to prevent the reed type conductor strip from buckling due to thermal expansion or contraction during temperature changes. Holding pins (12) project from the support member, through each of the elongated holes in the reed type conductor strip. The base bottom portion (22) contains a groove (30) adjacent to its second side portion (26) which holds strip magnet (13). The strip magnet serves to hold down the contact finger (44) of the reed type conductor strip. The cap (10) contains edge portions (38, 38'). When the cap and the base (4) are assembled the edge portions engage the lip portions (32, 32') of the base side portions (24, 26) so that the cap and base together form an enclosed inner container (40). A ridge (48) located on the inner portion (36) of the cap (10) contacts the holding pins (12) when the cap (10) and base (4) are assembled. The electrically resistive element (5) is positioned separated from the normal position of reed type conductor strip by a small gap. The electrically resistive element is fastened to the inner portion (36) of the cap (10) with an adhesive (14). A return wire (15) is electrically connected to the lower end of the electrically resistive element. The return wire is contained in a groove (46) in the outer portion (34) of the cap (10). All components described above, except for the holding pins, run continuously for the length of the position sensing device.

In operation, the reed type conductor strip (2) is held against the base (4) by the strip magnet (13). At the position occupied by the actuator (6) and attached horseshoe magnet (7), the greater magnetic strength of the horseshoe magnet lifts the contact fingers of the reed type conductor strip, causing an electrical contact with the electrically resistive element (5) at that point.

Figure 3:
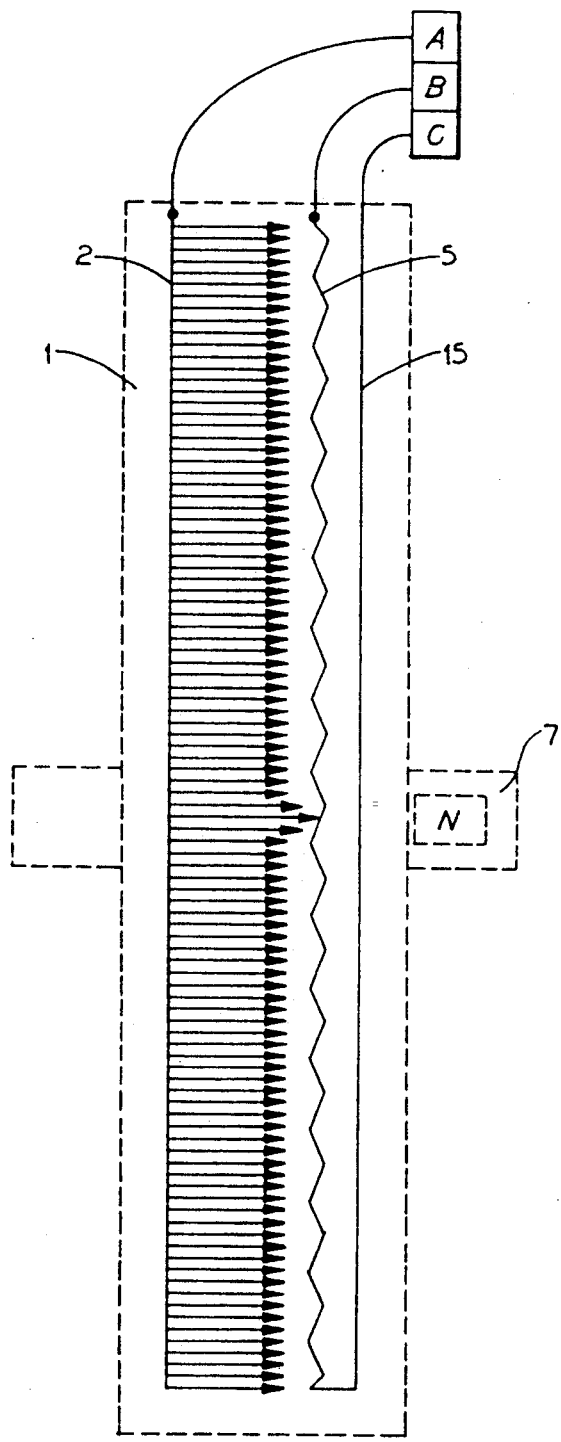
FIG. 3, is a schematic representation of the device illustrated in FIGS. 1 and 2.

In FIG. 3, is illustrated a schematic of the position sensing device. Sealed within a tubular container (1) is the reed type conductor strip (2), electrically resistive strip (5), and return wire (15). At the location of the actuator horseshoe magnet (7), the reed type conductor strip makes electrical contact with the electrically resistive strip. The electrical resistance between the reed type conductor strip at terminal A and both ends of the electrically resistive strip at terminal B and C varies depending on the linear position of the actuator horseshoe magnet.

Variations on this embodiment may include varying the relative location and strength of the strip magnet (13) to vary the hold down force and magnetic coupling to the reed type conductor strip. The electrically resistive element (5) may be of linear resistance, or may vary in resistance in some non-linear manner to compensate, for example, for the non-linear relationship between depth and volume in a tank. The electrically resistive element (5) may be fastened in place by some mechanical means other than an adhesive (14).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A linear position sensing device comprising:
   a) an elongate tubular outer container constructed of a non-magnetic material;
   b) an elongate base constructed of a non-magnetic material received within said outer container, said base having a top and bottom portion and first and second oppositely facing side portions, said top portion having an elongate slot formed therein adjacent said first side portion, and said bottom portion having an elongate groove formed therein adjacent said second side portion; said side portions being perpendicularly oriented with respect to said top portion and extending above said top portion; each of said side portions having a lip portion positioned above said top portion;
   c) an elongate cap constructed of a non-magnetic material received within said outer container, said cap having an outer portion and an inner portion, said inner portion having longitudinally oriented opposite edge portions, said edge portions abuttingly engaging said lip portions of said elongate base, said elongate cap and said elongate base together forming an enclosed inner container configured so as to be snugly received within said outer container;
   d) an elongate electrically resistive element connected to said inner portion of said cap adjacent said second side portion;
   e) an elongate support member disposed within said slot formed in said base top portion;
   f) a reed type conductor strip constructed of a ferromagnetic material connected to said support member along a back edge portion of said conductor strip; said support member and said reed type conductor strip being formed from materials having similar coefficients of thermal expansion; said conductor strip comprising a series of contact fingers formed along one edge thereof opposite said back edge and arranged at intervals along said conductor strip, said contact fingers positioned opposite to and spaced apart from said resistive element;
   g) a magnet received within said elongate groove formed in said base bottom portion; said strip magnet maintaining said contact fingers in spaced-apart relation with said resistive element; and
   h) magnetic actuator means slidably mounted on said outer container for causing at least one of said contact fingers adjacent thereto to make electrical contact with said resistive element.

2. A linear position sensing device according to claim 1 including an electrical means connected to one end of said resistive element and running the length of the linear position sensing device for allowing all external electrical connections to the linear position sensing device to be located on one end of the device.

3. A linear position sensing device as in claim 2 wherein said electrical means is a wire, wherein said cap further comprises a longitudinally oriented groove, and wherein said wire is contained in said groove in said cap.

4. A linear position sensing device as in claim 1 wherein said resistive element is connected to said inner portion of said cap with adhesive.

5. A linear position sensing device as in claim 1 wherein said inner portion of said cap includes a ridge, said ridge contacting the end of holding pins opposite said support member.

6. A linear position sensing device as in claim 1 wherein said resistive element comprises an electrically resistive wire wound around a flat core constructed of an electrically insulating material.

* * * * *